US008155306B2

(12) United States Patent
Brickell et al.

(10) Patent No.: US 8,155,306 B2
(45) Date of Patent: Apr. 10, 2012

(54) METHOD AND APPARATUS FOR INCREASING THE SPEED OF CRYPTOGRAPHIC PROCESSING

(75) Inventors: Ernie F. Brickell, Portland, OR (US); Gary L. Graunke, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 778 days.

(21) Appl. No.: 11/008,904

(22) Filed: Dec. 9, 2004

(65) Prior Publication Data

US 2006/0126843 A1    Jun. 15, 2006

(51) Int. Cl.
*G06F 21/00* (2006.01)
(52) U.S. Cl. ........... 380/28; 380/277; 380/259; 380/260
(58) Field of Classification Search ............... None
See application file for complete search history.

(56) References Cited

U.S. PATENT DOCUMENTS

| | | | | |
|---|---|---|---|---|
| 5,454,039 A * | 9/1995 | Coppersmith et al. | ......... | 380/28 |
| 6,442,525 B1 * | 8/2002 | Silverbrook et al. | ........... | 705/50 |
| 6,597,790 B1 | 7/2003 | Yamamoto | | |
| 7,054,445 B2 * | 5/2006 | Gligor et al. | ................. | 380/37 |
| 7,095,850 B1 * | 8/2006 | McGrew | ........................ | 380/42 |
| 7,110,539 B1 * | 9/2006 | Bao et al. | ........................ | 380/28 |
| 7,242,766 B1 * | 7/2007 | Lyle | ................................ | 380/2 |
| 7,336,783 B2 * | 2/2008 | Park | ................................ | 380/28 |
| 7,397,916 B2 * | 7/2008 | Johnson et al. | ................ | 380/28 |
| 7,406,176 B2 * | 7/2008 | Zhu et al. | ..................... | 380/200 |
| 7,987,510 B2 * | 7/2011 | Kocher et al. | ................... | 726/27 |
| 8,055,910 B2 * | 11/2011 | Kocher et al. | .................. | 713/193 |
| 2001/0010722 A1 | 8/2001 | Enari | | |
| 2002/0178360 A1 * | 11/2002 | Wenocur et al. | ............... | 713/170 |
| 2002/0199001 A1 * | 12/2002 | Wenocur et al. | ............... | 709/227 |
| 2003/0165242 A1 * | 9/2003 | Walker | .......................... | 380/277 |
| 2003/0220984 A1 * | 11/2003 | Jones et al. | .................... | 709/219 |
| 2004/0003246 A1 * | 1/2004 | Hopkins et al. | ................ | 713/168 |
| 2004/0133794 A1 * | 7/2004 | Kocher et al. | .................. | 713/193 |

(Continued)

FOREIGN PATENT DOCUMENTS

WO    WO 01/58079 A2    8/2001

OTHER PUBLICATIONS

Aikawa, Makoto. Takaragi, Kazuo. Furuya, Soichi. Sasamoto, Manabu. "A Lightweight Encryption Method Suitable for Copyright Protection". IEEE Transactions on Consumer Electronics. vol. 44, issue 3. Pub. Date: Aug. 1998. Relevant pp. 902-910. Found on the World Wide Web at: http://ieeexplore.ieee.org/stamp/stamp.jsp?tp=&arnumber=713212.*

(Continued)

*Primary Examiner* — Nathan Flynn
*Assistant Examiner* — Jeremiah Avery
(74) *Attorney, Agent, or Firm* — Blakely, Sokoloff, Taylor & Zafman LLP

(57) ABSTRACT

Encrypting data in a cascaded block cipher system may be accomplished by applying a first encryption algorithm using a secret shared between first and second parties as a key to generate a secret inner key; applying a second encryption algorithm for a predetermined number of rounds using the secret inner key to generate a plurality of blocks of ciphertext data from a plurality of blocks of plaintext data; and repeating the applying the first encryption algorithm and the applying the second encryption algorithm steps.

16 Claims, 7 Drawing Sheets

U.S. PATENT DOCUMENTS

2005/0021986 A1* 1/2005 Graunke et al. .............. 713/193
2007/0033419 A1* 2/2007 Kocher et al. ................. 713/193

OTHER PUBLICATIONS

Bruce Schneier, 17.11 Cascading Multiple Stream Ciphers, Applied Cryptography Second Edition: protocols, algorithms, and source code in C, 1996, pp. 419-420, John Wiley & Sons, Inc., USA and Canada.

Mitsuyama Y. et al.;"Embedded Architecture of IEEE802.11i Cipher Algorithms";Consumer Electronics, 2004 IEEE International Symposium on Reading; Sep. 1, 2004; pp. 241-246. XP010755781.

Moldovyan N.A. et al.;"New Class of the FPGA Efficient Crytographic Primitives"; Circuits and Systems, 2004. ISCAS; vol. 2, May 23, 2004,; pp. 553-556.: XP10720228A.

Intenational Application No. PCT/US2005/044702; International Search Report and Written Opinion of the ISA; Filing Date: Dec. 9, 2005.

Notice of Preliminary Rejection for *Korean Patent Application* No. 10-2007-7014110 dated Nov. 24, 2008 and mailed by Korean Associate on Dec. 5, 2008, incl. Translation, 7 pgs.

International Preliminary Report on Patentability, PCT/US2005/044702, mailed Jun. 21, 2007, 8 pgs.

EPO, "Office Action", European Patent Application No. 05 853 584.0, Mailed Jul. 29, 2009, 3 pages.

CN PTO, "First Office Action", Chinese Application No. 200580042142.3', Mailed Dec. 11, 2009, Whole Document.

Mussa, Ali T., et al., "Enhanced Counter Mode", School of Computer Science, Intel Technology, 2003. Last Accessed IEEE Sep. 6, 2009., (2003), whole document.

Yamamoto, Takahisa, et al., Practical Cryptosystems Using Quadratic Residue Pseudo-Random Number Generators and Block Ciphers, ISEC93-29, The Institute of Electronics, Information and Communication Engineers, Aug. 30, 1993, vol. 93, No. 20, pp. 65-75.

Non-Final Office Action mailed Jul. 27, 2010 (JP Associate mail date Aug. 5, 2010) for JP Application No. 2007-545683.

Decision of Refusal mailed Nov. 24, 2010 for Japanese Patent Application No. 2007-545683, Whole Document.

Second Office Action mailed Jul. 5, 2011 for Chinese Patent Application No. 2005 80042142.3, Whole Document.

* cited by examiner

METHOD AND APPARATUS FOR INCREASING THE SPEED OF CRYPTOGRAPHIC PROCESSING

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to cryptography and, more specifically, to encryption and decryption processing.

2. Description

Encryption algorithms are used to encrypt plaintext data into ciphertext data in order to protect the content of the plaintext data from unauthorized access. Various encryption algorithms are known in the art to perform this processing. Encryption may be implemented in hardware, or in software. When implemented in software, some encryption algorithms may consume significant processing resources. For example, when the plaintext data represents uncompressed high definition video content, software-based encryption may be too slow for some applications. Hence, techniques that speed up encryption processing, yet still provide adequate security, are desirable. Further, corresponding techniques to speed up decryption processing are also desirable.

BRIEF DESCRIPTION OF THE DRAWINGS

The features and advantages of the present invention will become apparent from the following detailed description of the present invention in which.

DETAILED DESCRIPTION

Embodiments of the present invention comprise a method and apparatus for performing a cryptographic algorithm in a fast, but secure manner. An embodiment of the present invention uses a strong counter mode encryption algorithm in combination with a reduced round encryption algorithm to achieve higher speed encryption and still maintain strong security. Embodiments include a cascading block cipher system using a strong outer cipher in counter mode to produce keying material (inner keys) and a faster, relatively weak inner cipher operating only a limited number of encryptions with each generated inner key. The inner key may be changed often so that an adversary cannot get enough plaintext/ciphertext pairs to break the inner cipher. Further, even if the adversary can compute one inner key, this fact does not help the adversary compute any other inner key. In some embodiments, a shared secret state may be generated from a symmetric encryption algorithm in counter mode to enhance the security of overall encryption processing. Additionally, corresponding techniques may be used for decryption processing.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
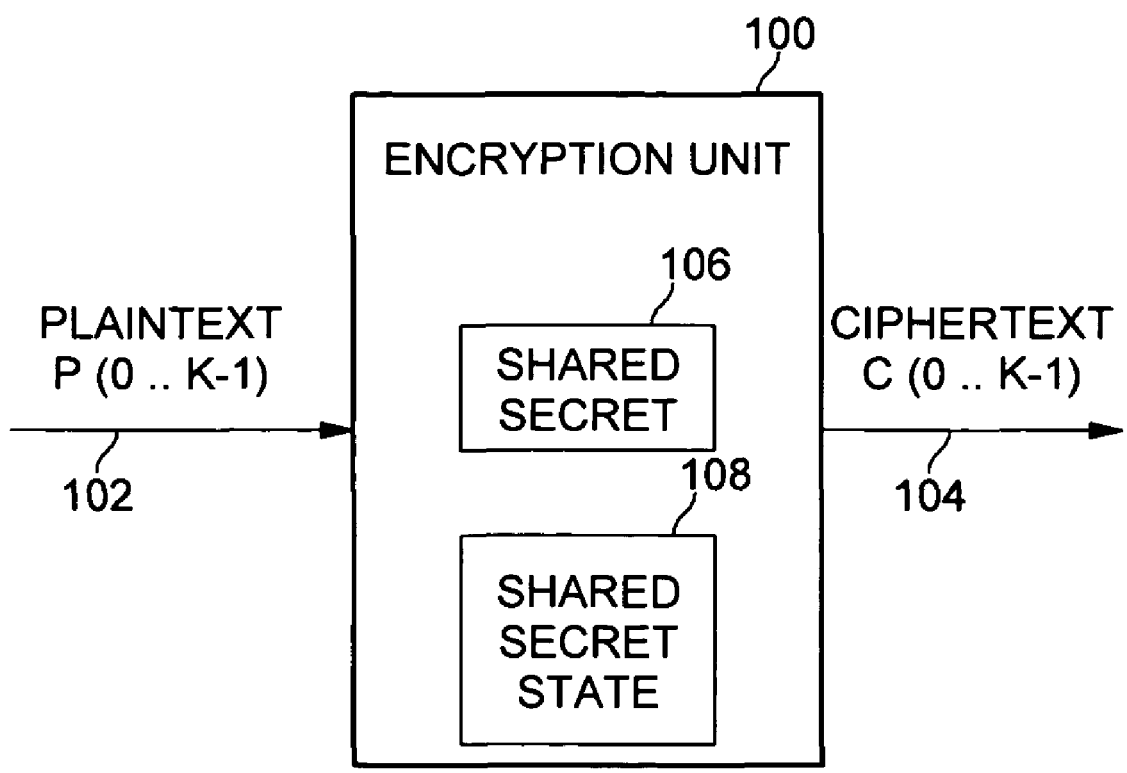
FIG. 1 is a diagram of an encryption unit according to an embodiment of the present invention.

FIG. 1 illustrates an encryption unit according to an embodiment of the present invention. Encryption unit 100 performs encryption processing to transform k blocks of plaintext data P (0 ... k−1) 102 into ciphertext data C (0 ... k−1) 104. According to some embodiments, encryption unit 100 uses shared secret 106 and shared secret state 108 values in performing encryption operations as defined further below. Encryption unit 100 may be implemented in either hardware or software. To perform decryption, a decryption unit (not shown) transforms blocks of ciphertext into plaintext using corresponding decryption operations.

Figure 2:
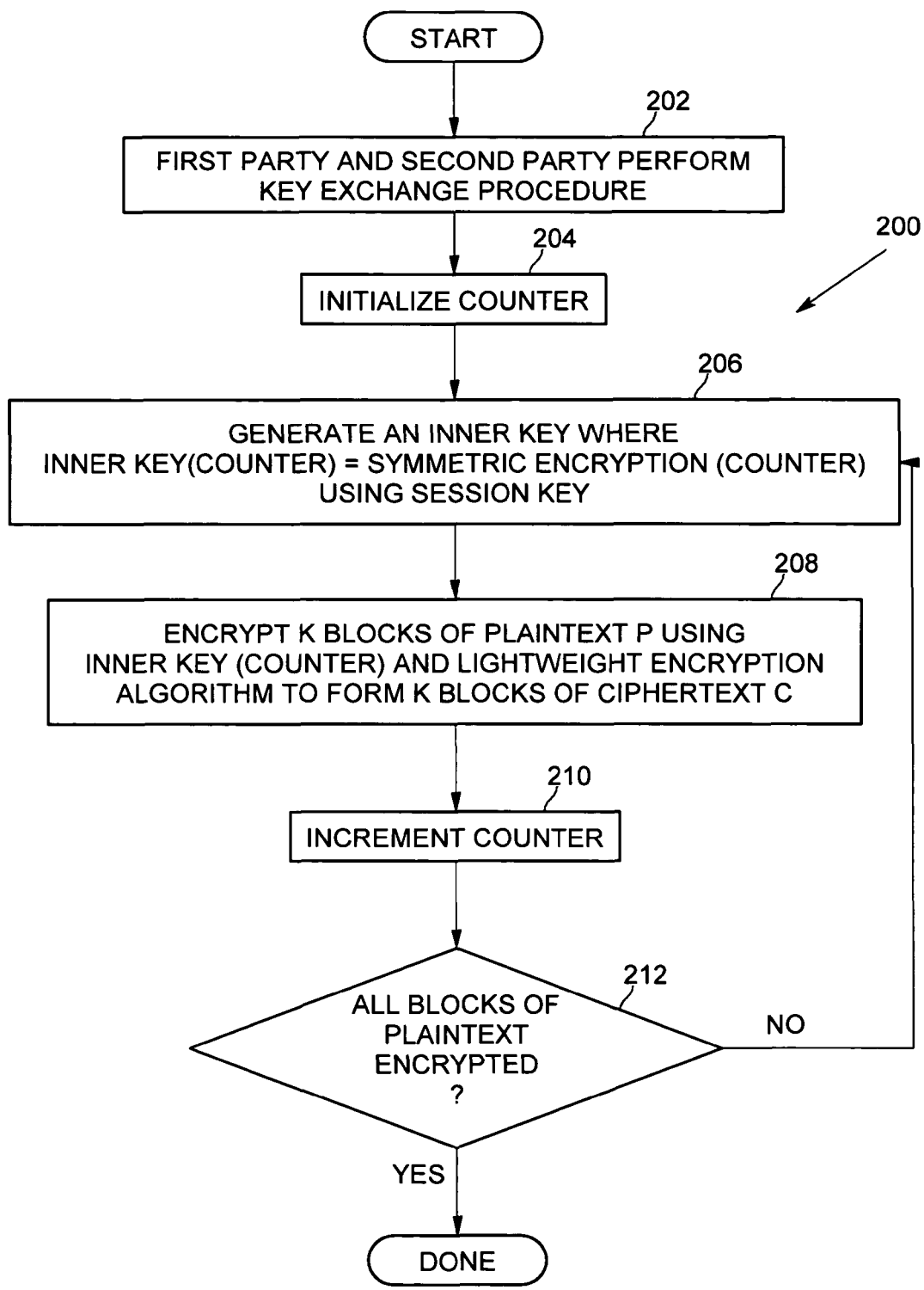
FIG. 2 is a flow diagram illustrating encryption processing according to an embodiment of the present invention.

FIG. 2 is a flow diagram 200 illustrating encryption processing performed by encryption unit 100 according to an embodiment of the present invention. Assume there are two parties that desire to exchange data in a protected manner. The first party and the second party perform a well known key exchange procedure to define a shared secret 106 at block 202. In one embodiment, the well known Diffie-Hellman key exchange procedure may be used. In one embodiment, the shared secret comprises a session key, the session key being at least a portion of the shared secret. The session key may be a cryptographic key used for symmetric cryptographic processes. In other embodiments, the shared secret comprises a bit string of any length (e.g., 1024 bits, 2048 bits, etc.), and the session key may be derived from the shared secret by a computation which uses the shared secret as an input parameter.

At block 204, an inner key counter j may be initialized. At block 206, the party desiring to encrypt plaintext data generates the j'th inner key, where each inner key (j=0 ... number of inner keys−1) is equal to the symmetric encryption of counter j using the session key as the key. In one embodiment, the symmetric encryption operation comprises application of the well known Advanced Encryption Standard (AES) algorithm in AES Counter (CTR) mode (as specified in the National Institute of Standards and Technology (NIST) Special Publication 800-38A, 2001 edition) to generate the stream of inner keys. In the typical usage of Counter mode of AES, the encryption of counter j is used directly to encrypt a plaintext block P(i) into a ciphertext block, e.g., C(i)=P(i) XOR AES(j), where AES(j) denotes the AES encryption of counter j using the session key as the AES key. However, in embodiments of the present invention, the inner keys may be used in a different and novel way as described herein. Let InnerKey(j)=AES(j) denote the j'th inner key. At block 208, the encrypting party encrypts k blocks of plaintext P(j*k+0), P(j*k+1), ..., P(j*k+k−1) using the InnerKey(j) and a known selected "lightweight" encryption (LWE) algorithm to form ciphertext blocks C(j*k+0), C(j*k+1), ..., C(j*k+k−1).

In one embodiment, the encryption of block 208 is performed as follows:

For i=j*k+0, ... j*k+k−1, let C(i)=P(i) encrypted by Inner-Key(j) using a "lightweight" encryption algorithm (LWE).

Next, at block 210, the inner key counter j may be incremented. At block 212, if all blocks of plaintext data have been encrypted, the processing ends. Otherwise, more blocks of plaintext data are to be encrypted, so processing continues with the next set of k blocks at block 206, using the incremented value of the counter j.

In an embodiment, the "lightweight" encryption (LWE) algorithm may comprise a well known, standard cryptographic algorithm, but using fewer rounds so that the encryption is much faster than the standard implementation. For example, only two or three rounds of the well known Rijndael algorithm may be used instead of ten. Alternatively, only three or four rounds of the well known Serpent algorithm may be used instead of 32 rounds. Despite using fewer rounds, the resulting encryption provides sufficient security in the context of the present invention. Details on the Rijndael and Serpent algorithms may be found in proceedings of "The First AES Candidate Conference", NIST, Aug. 20-22, 1998. In other embodiments, other numbers of rounds of either of these algorithms may be used, or other encryption algorithms may be used.

In this embodiment, a strong counter mode encryption algorithm (e.g., AES) may be used in combination with a reduced round encryption algorithm (e.g., Rijndael or Serpent for a small number of rounds) to achieve higher speed encryption and still maintain strong security.

Pseudo-code for an embodiment of the present invention is shown in Table I.

TABLE I

© 2004 Intel Corporation
Let LWE be a light weight encryption process, such as a 2 round Rijndael or a 3 round Serpent, for example.
i = 0 /* counts number of blocks of data */
j = 0 /* counts inner keys *1
Repeat until all plaintext has been encrypted:
    {InnerKey(j) ←j encrypted by Session Key using AES in Counter mode
    Repeat k times, /* k is the block size */
        {
        C(i) ←P(i) encrypted by InnerKey(j) using LWE
        i ←i + 1
        }
    j ←j+1
}

Figure 3:
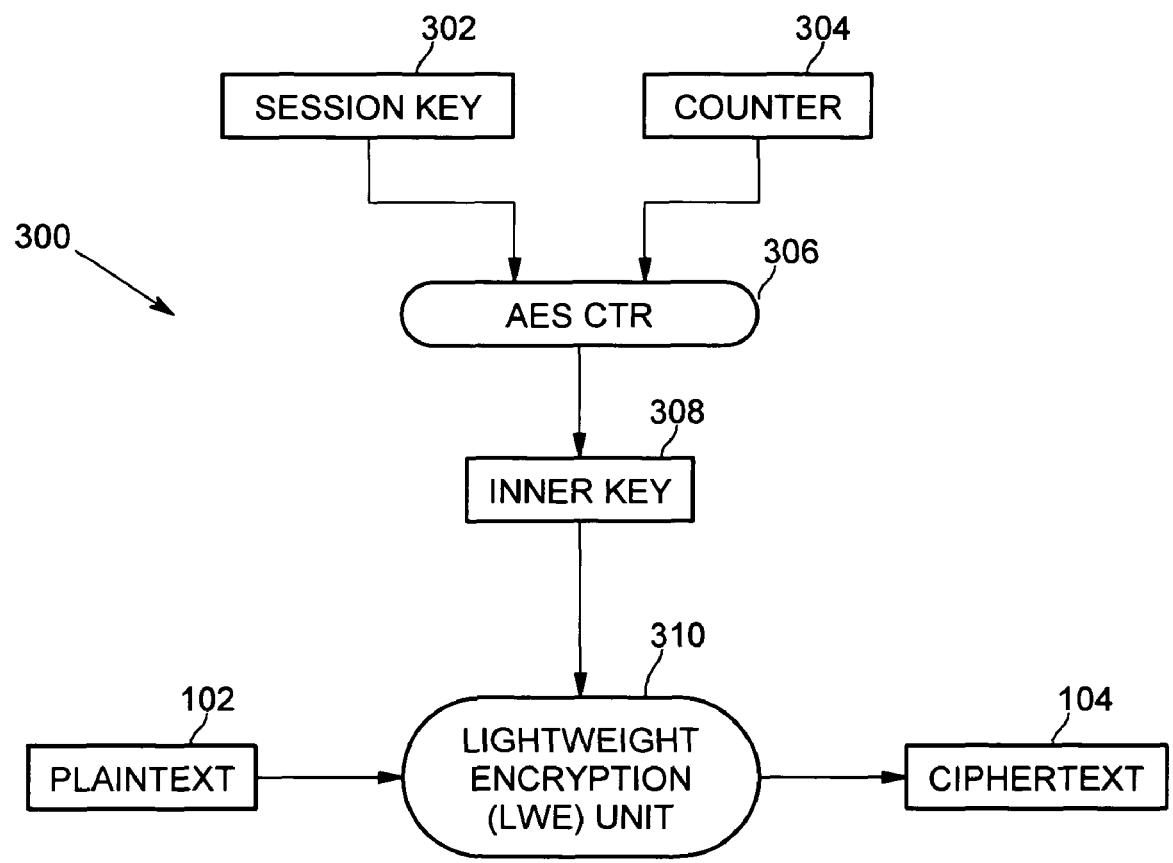
FIG. 3 is a diagram of an encryption system according to an embodiment of the present invention.

FIG. 3 is a diagram of an encryption system according to an embodiment of the present invention. In the cascaded block cipher of FIG. 3, counter value 304 may be encrypted using a shared secret, such as session key 302, and a symmetric encryption algorithm, such as AES in Counter mode 306 for example, to produce an inner key 308. The inner key 308 may be used with a lightweight encryption (LWE) unit to encrypt blocks of plaintext 102 into ciphertext 104. In one embodiment, the LWE unit comprises implementation of two or three rounds of the well known Rijndael algorithm. Alternatively, the LWE unit may implement three or four rounds of the well known Serpent algorithm. Inner key 308 may be changed frequently by modifying counter value 304 and generating a new inner key using the modified counter value and the AES algorithm in Counter mode. In one embodiment, the counter value may be incremented for every selected k blocks of plaintext data. By changing the inner key frequently, the security of the resulting ciphertext may be improved.

Figure 4:
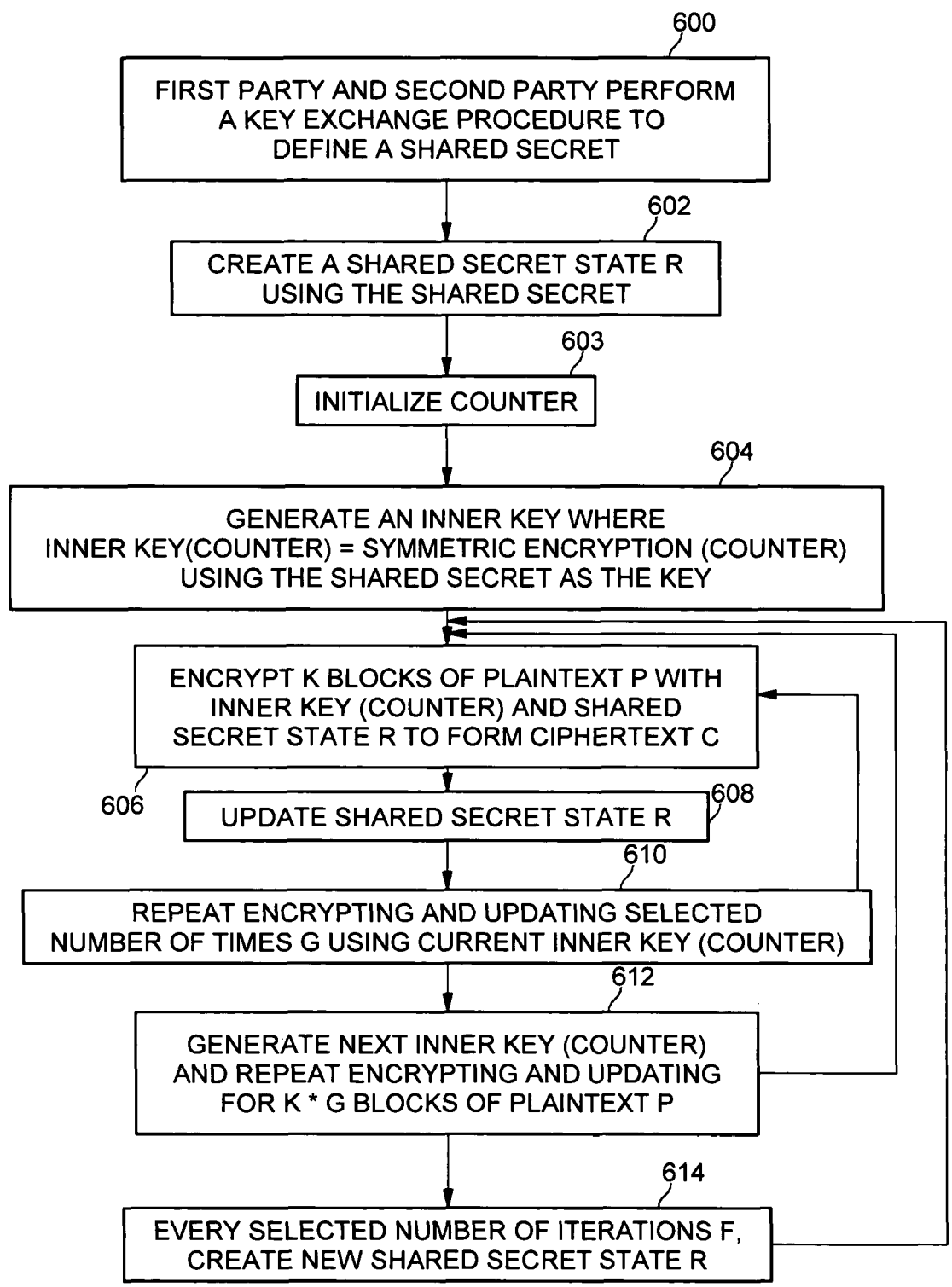
FIG. 4 is a flow diagram illustrating encryption processing according to a further embodiment of the present invention.

FIG. 4 is a flow diagram illustrating encryption processing performed by encryption unit 100 according to a further embodiment of the present invention. In this embodiment, an encryption algorithm such as AES in counter mode may be used as an outer cipher to provide an inner key and shared state, and a weaker, faster encryption algorithm may be used as an inner cipher to generation an encryption mask. The encryption mask may be exclusive-or'ed with plaintext data to produce ciphertext data.

The cascaded cipher structure comprises an outer and inner cipher. The outer cipher may be used as a key stream generator to produce keys used for the inner cipher. The outer cipher may also be used as a state generator for a shared secret state that is used by the inner cipher in the generation of an encryption mask. The inner cipher may be used with a reduced number of rounds to increase the speed of the cipher and to reduce the amount of processing power to handle a large quantity of data. The inner cipher may be used to encrypt the state to produce a bit stream that is XOR'ed with plaintext data. After all of the shared secret state is encrypted, an update function may be applied to modify the shared secret state. The new shared secret state may then be encrypted to extend the bit stream. This process may be repeated. Due to the reduced strength of the inner cipher, the number of blocks for which the inner cipher is allowed to be used is kept small. When the block limit is reached, the outer cipher is reengaged to produce a new inner cipher key and shared secret state.

Assume there are two parties that desire to exchange data in a protected manner. The first party and the second party perform a well known key exchange procedure to define a shared secret 106 at block 600. In one embodiment, the shared secret comprises a session key, the session key being a portion of the shared secret. The session key may be a cryptographic key used for symmetric cryptographic processes. In other embodiments, the shared secret comprises a bit string of any length. The shared secret may be used to create a plurality of cryptographic parameters known as a shared secret state R 108. At block 602, each party creates its own copy of the shared secret state R based on the shared secret. One method for creating the cryptographic parameters of the shared secret state R is to apply a known cryptographic hash function. For each different cryptographic parameter, a name for the parameter and the shared secret may be hashed together by applying the hash function to form the cryptographic parameter. Another method for creating the cryptographic parameters of the shared secret state R is to apply a known encryption function (such as AES, for example). For each different cryptographic parameter, a name for the parameter may be encrypted with the shared secret 106 to form the cryptographic parameter. In other embodiments, other methods may also be used. Thus, because the two parties have a shared secret 106, they can form other shared secrets 108. At block 603, an inner key counter j may be initialized.

At block 604, the party desiring to encrypt plaintext data generates the j'th inner key, where each inner key a (j=

0 . . . number of inner keys−1) is equal to the symmetric encryption of counter j using the shared secret as the key. In one embodiment, the shared secret used comprises the session key. In one embodiment, the symmetric encryption operation comprises application of the well known Advanced Encryption Standard (AES) algorithm in AES Counter (CTR) mode (as specified in the National Institute of Standards and Technology (NIST) Special Publication 800-38A, 2001 edition) to generate the stream of inner keys. In the typical usage of Counter mode of AES, the encryption of key j is used directly to encrypt a plaintext block P(i) into a ciphertext block C(i)=P(i) XOR key AES(j), where AES(j) denotes the AES encryption of counter j using the session key as the AES key. However, in embodiments of the present invention, the inner keys may be used in a different and novel way as described herein.

In one embodiment, let $R_0, R_1, \ldots, R_{k-1}$ denote the shared secret state R, where k is the number of cryptographic parameters created at block 602. At block 606, the encrypting party encrypts k blocks of plaintext $P(0), P(1), \ldots, P(k-1)$ using the inner key generated at block 604 and the shared secret state R to form ciphertext blocks $C(0), C(1), \ldots, C(k-1)$.

In one embodiment, the encryption of block 606 is performed as follows:

For i=0 . . . k−1, let T(i)=R(i) encrypted by the inner key (j) using a "lightweight" encryption algorithm (LWE), where T is temporary storage within the encryption unit, and then let C(i)=P(i) XOR T(i).

Next, at block 608, the shared secret state R may be updated in a "lightweight" manner. In one embodiment, the lightweight updating may be performed by a two round AES cipher as the inner cipher. In another embodiment, the lightweight updating may be performed by a three round Serpent cipher as the inner cipher. These resemble key expansion functions, and provide non-linearity, mixing of R(i) values, and provide better performance than the LWE algorithm.

In the AES embodiment for lightweight updating (LWUD) of the shared secret state, the difference between the LWUD and the AES key schedule is that the LWUD uses the last block value to provide mixing between R(i) values. The LWUD function used with AES as the inner cipher uses a key schedule-like process. The LWUD function operates on a single R(i) value within the state data. Each R(i) value is handled as four 32 bit values that are treated as described in FIPS 197 and updated sequentially. The first 32 bit value, $R_{i,0}$, uses an S-box lookup that includes input from the last word of the previous block, $R_{i-1,3}$. If the index i is zero, then the value $R_{RCOUNT-1,3}$ (wrap around) may be used. The following sequence of operations may be used to update $R_{i,0}$.

1. If i is zero then set temp to $R_{i-1,3}$ else set temp to $R_{RCOUNT-1,3}$
2. Apply the standard AES RotWord( ) transformation to temp; on little-endian processors, this is equivalent to a 24 bit left rotation of the 32 value
3. Apply the standard AES SubBytes( ) transformation to temp to cause each byte of temp to be replaced by its standard AES S-box value
4. Set $R_{i,0}$ to temp XOR $R_{i,0}$ The remaining values, $R_{i,1}$ through $R_{i,3}$ are updated by setting them to the XOR of themselves with the previous word in the block. For instance, $R_{i,2}$ is set to $R_{i,2}$ XOR $R_{i,1}$. In one embodiment, an additional row shift can be added at this point, so that row 2 is cyclically shifted one byte to the left, row 3 is cyclically shifted two bytes to the left, and row 4 is cyclically shifted three bytes to the left. In another embodiment, the XOR of temp with $R_{i,0}$ could occur before step 3 instead of after step 3.

An optimization to handle the wrap around reference to $R_{i-1,3}$ is the following. After new state data is generated, set temp to $R_{RCOUNT-1,3}$. This handles the wrap around case the first time state block $R_0$ is updated. Additionally, whenever a block is updated, set temp to $R_{i,3}$. This will automatically handle all cases, including the wrap around case, for all block updates until the inner key is replaced.

Figure 5:
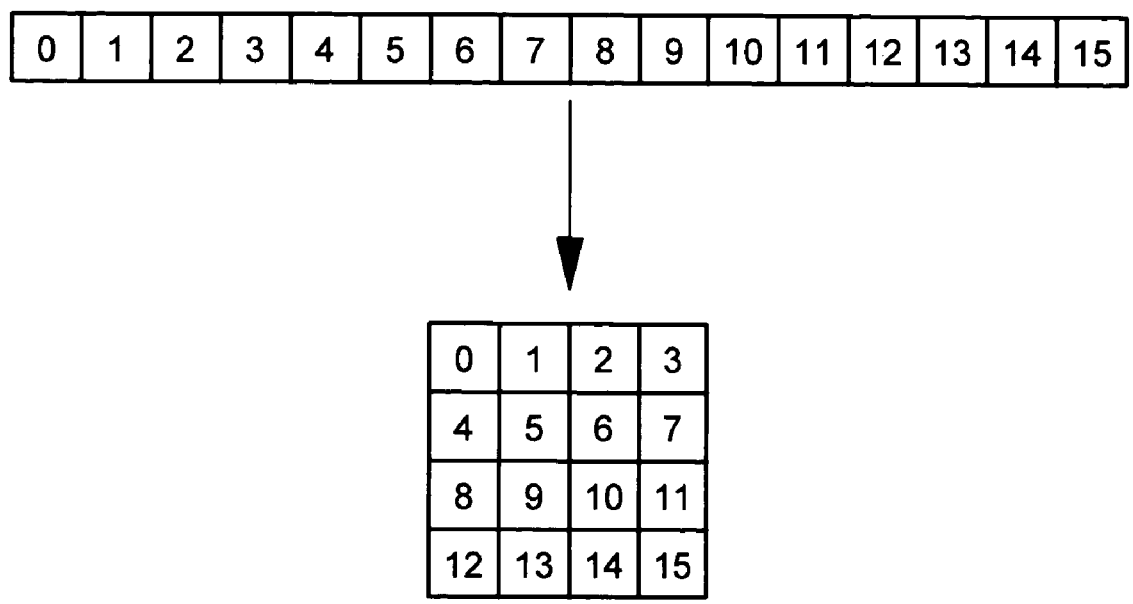
FIG. 5 is a diagram of mapping of sets of words to a grid pattern for a lightweight update function according to an embodiment of the present invention.

In the Serpent embodiment, a different LWUD function may be used. The update function for use with Serpent cipher operates on sequences of four standard Serpent blocks of 128 bits each. Each set of four blocks is treated as a four-by-four grid of 32-bit little-endian words. FIG. 5 illustrates the mapping of each set of 16 words to the grid pattern used by the updated function. The words are shown in memory order. Using the recommended parameters above, the eight 128-bit Serpent blocks in the state data are organized into two sets of grid data.

Figure 6:
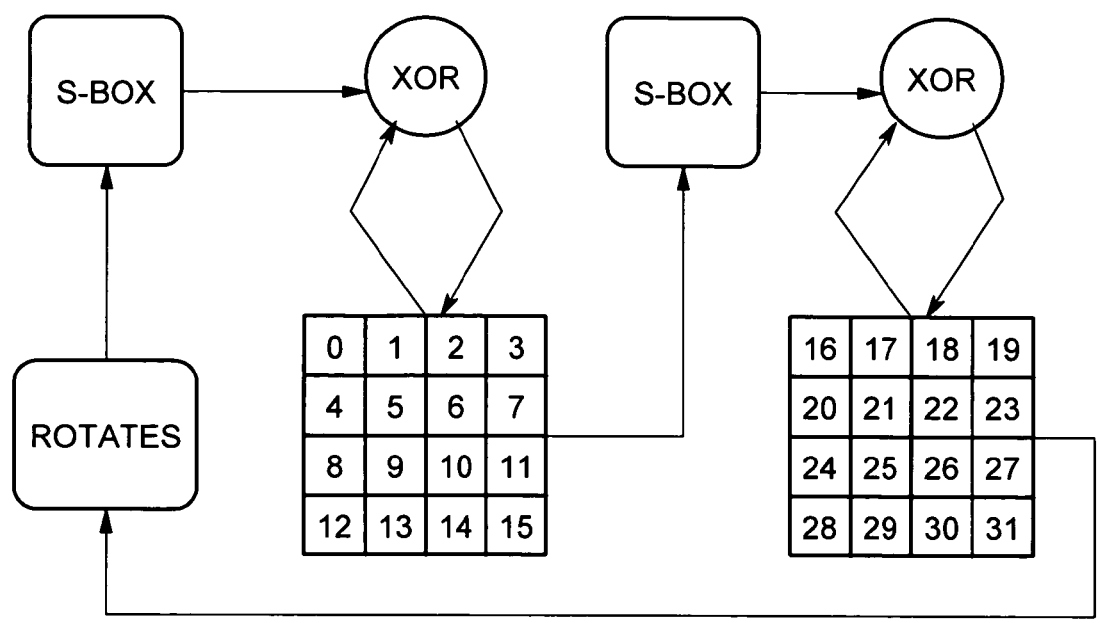
FIG. 6 is a flow diagram of a lightweight update function according to an embodiment of the present invention.

FIG. 6 illustrates the overall state update function flow for this embodiment. The process uses a temporary four-by-four "update grid" (not shown) that is used to propagate data between the update steps. Following the diagram from left to right shows the operations performed to complete a state update with the recommended parameters. The update function uses the following steps:

1. Copy the last grid in the state data into the update grid
2. Apply a data rotation process to the update grid
3. For each grid in the state, do the following
4. Apply S-box substitution to the update grid
5. Replace each word of the update grid with the XOR of itself with the corresponding word in the current state grid
6. Overwrite the contents of the current state grid with the contents of the update grid The rotate stage is only performed once at the beginning of the state update function (Step 2 above). It causes a heavy interaction between all bits in the state data. It is not performed in the processing of each grid in the state data because part of the processing is "slow" compared to the other update operations.

Returning to FIG. 4, at block 610, the encrypting and updating of blocks 606 and 608 may be repeated a selected number of times (denoted g herein) using the current Inner-Key(j). A new inner key may then be generated at block 612 and blocks 606, 608, and 610 may be repeated for k*g blocks of plaintext data P. At block 614, every selected number of iterations f, a new shared secret state R may be created. In one embodiment, generation of a new shared secret state comprises application of the AES encryption algorithm to encrypt each parameter of the shared secret state using the new inner key in a "strong update" manner. In another embodiment, generation of a new shared secret state R may be accomplished by incrementing the counter j, and using the encryption of the next k values of the counter for the values of $R_0$, $R_1, \ldots, R_{k-1}$. When all blocks of plaintext data have been processed into ciphertext data, processing ends.

In one embodiment, the parameters for k, g, and f, may be chosen such that f*k*g is less then or equal to 256. In an embodiment, the components of shared secret state R may be encrypted using 128-bit keys as shared secrets.

An embodiment of the present invention is defined more formally below in the pseudo-code of Table II.

TABLE II

```
© 2004 Intel Corporation
Select parameters k, g, and f
Let LWE be a light weight encryption process, such as a 2 or 3 round Rijndael or
a 3 or 4 round Serpent, for example.
Let LWUD (Lightweight Update) be a function which takes as input the Shared
Secret State, and inner key (j), and outputs a new Shared Secret State. LWUD
should be fast and involve cryptographic scrambling operations.
Let SUD (Strong Update) be a function which takes as input the Shared Secret
State R and inner key (j), and outputs a new Shared Secret State. SUD should
be very strong cryptographically and execute in time similar to the time of an
AES encryption.
An example of SUD is:
      Shared Secret State = R(0), R(1), ... , R(k-1)
      For i = 0 .. k-1, R(i) ←R(i) encrypted by InnerKey(j) using AES.
i = 0 /* i counts total blocks of data */
j = 0 /* j counts inner keys */
Let R(0), R(1), ... , R(k-1) be the Shared Secret State
Repeat until all Plaintext has been encrypted:
      {Repeat f times:      /* change shared secret state every f times */
            {InnerKey(j) ←j encrypted by Session Key using AES in Counter
            mode
            Repeat g times:
                  {For ik = 0 to k - 1,
                        {T(ik) ←R(ik) encrypted by InnerKey(j) using LWE
                        C(i) ←P(i) XOR T(ik)
                        i ←i + 1
                        }
                  Shared Secret State ←LWUD (Shared Secret State)
                  }
            j ←j + 1
            }
      Shared Secret State ←SUD (Shared Secret State)
      }
```

The efficiency of embodiments of the present invention compare favorably to an implementation of the well known AES algorithm. If the LWE algorithm is two rounds of the well known Rijndael algorithm or three rounds of the well known Serpent algorithm, then processing time for LWE is about $1/5$ of the time of processing AES. Let us count the number of AES encryptions to encrypt $f*g*k$ plaintext blocks. Suppose that the LWUD and SUD methods are the examples given earlier. There are f AES encryptions to compute the f masks. There are also f key expansion operations to set up the LWE for using mask (j). Let us approximate this as about the same amount of time as an AES encryption. There are k+1 AES encryptions to compute for SUD. There are $g*f$ LWE encryptions to compute the LWUD, and there are $f*g*k$ LWE encryptions to compute the T(ik)'s. Thus, the total processing time is approximately $2f+k+1+g*f/5+f*g*k/5$ AES encryptions. If we divide this by $f*g*k$ to get the amortized amount of computation per plaintext block, we get: $2/(gk)+1/(fg)+1/(fgk)+1/(5k)+1/5$. If we set f=g=k=16, then this sum is approximately 23% of an AES encryption, for a projected speed improvement of over 4. In some embodiments, three rounds of Rijndael or four round of Serpent may be preferred, but the speed improvement will be less.

Figure 7:
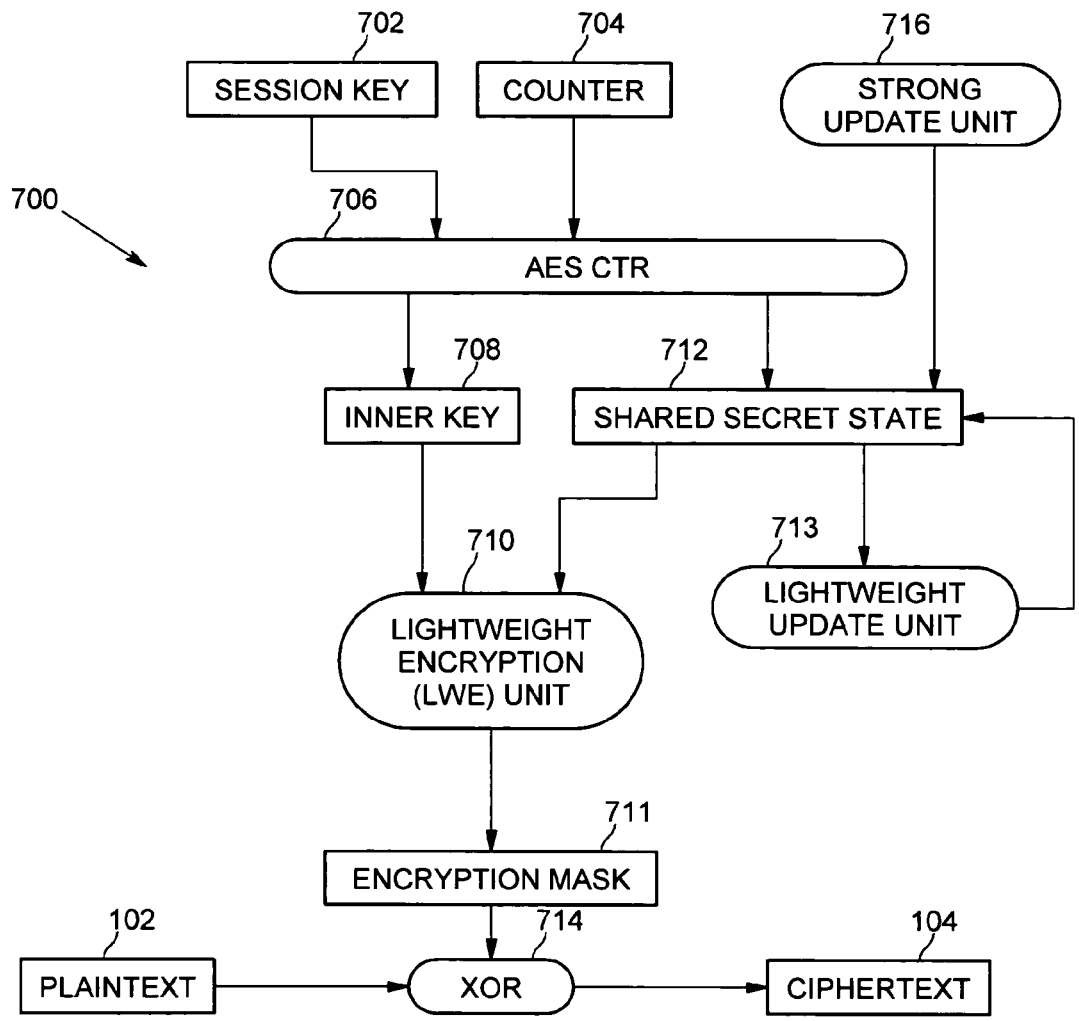
FIG. 7 is a diagram of an encryption system according to a further embodiment of the present invention.

FIG. 7 is a diagram of an encryption system according to a further embodiment of the present invention. In the cascaded block cipher of FIG. 7, counter value 704 may be encrypted using a shared secret, such as session key 702, and a symmetric encryption algorithm, such as AES in Counter mode 706 for example, to produce an inner key 708. In one embodiment, AES may also be used to generate shared secret state 712. The inner key 708 may be used with a lightweight encryption (LWE) unit 710 to generate an encryption mask T 711, which is input to XOR function 714 to encrypt blocks of plaintext 102 into ciphertext 104. Lightweight update unit 713 may be used to update the shared secret state 712. In one embodiment, the LWE unit comprises implementation of two rounds of the well known Rijndael algorithm. Alternatively, the LWE unit may implement three rounds of the well known Serpent algorithm. Alternatively, three rounds of Rijndael or four rounds of Serpent may be used. Inner key 708 may be changed frequently by modifying counter value 704 and generating a new inner key using the modified counter value and the AES algorithm in Counter mode. In one embodiment, the counter value may be incremented for every selected k blocks of plaintext data. By changing the inner key frequently, the security of the resulting ciphertext may be improved. Periodically, shared secret state 712 may be re-generated by strong update unit 716.

Although encryption processing has been described in detail for the various embodiments herein, one skilled in the art will recognize that performance of decryption processing based on the present invention will require the appropriate inverse operation on ciphertext to produce plaintext data.

Although the operations disclosed herein may be described as a sequential process, some of the operations may in fact be performed in parallel or concurrently. In addition, in some embodiments the order of the operations may be rearranged without departing from the spirit of the invention.

The techniques described herein are not limited to any particular hardware or software configuration; they may find applicability in any computing or processing environment. The techniques may be implemented in hardware, software, or a combination of the two. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information.

The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, and optical and magnetic disks. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
    encrypting, via a processor, at least one set of plaintext data including a plurality of plaintext data blocks stored in memory, wherein encrypting each set of plaintext data includes
        applying a first encryption algorithm in a counter mode using a secret shared between first and second parties as a key to generate a secret inner key, and
        applying a lightweight encryption algorithm, using the secret inner key to generate a block of ciphertext data from each of the plurality of plaintext data blocks, wherein the lightweight encryption algorithm is a different type of algorithm than the first encryption algorithm.

2. The method of claim 1, wherein the first encryption algorithm comprises the Advanced Encryption Standard (AES) encryption algorithm, and the lightweight encryption algorithm comprises at least one of the Rijndael algorithm and the Serpent algorithm.

3. An article comprising:
    a non-transitory storage medium having a plurality of machine readable instructions, wherein when the instructions are executed by a processor, the instructions provide for encryption of at least one set of plaintext data including a plurality of plaintext data blocks into ciphertext data, the instructions including, for each set of plaintext data
        applying a first encryption algorithm in a counter mode using a secret shared between first and second parties as a key to generate a secret inner key, and
        applying a lightweight encryption algorithm, using the secret inner key to generate a block of ciphertext data from each of the plurality of plaintext data blocks, wherein the lightweight encryption algorithm is a different type of algorithm than the first encryption algorithm.

4. The article of claim 3, wherein the first encryption algorithm comprises the Advanced Encryption Standard (AES) encryption algorithm and the lightweight encryption algorithm comprises at least one of the Rijndael algorithm and the Serpent algorithm.

5. The article of claim 3, wherein the first encryption algorithm comprises the Rijndael algorithm and the lightweight encryption algorithm comprises the Serpent algorithm.

6. A cascading block cipher system comprising:
    a processor;
    a memory to store at least one set of plaintext data, each set of plaintext data including a plurality of blocks of plaintext data;
    a first encryption unit, executed via the processor, operating in a counter mode using a secret shared between first and second parties as a key to generate a secret inner key for each set of plaintext data; and
    a lightweight encryption unit, executed via the processor, operating using the secret inner key to generate blocks of ciphertext data from the blocks of plaintext data, the lightweight encryption unit to implement a different type of algorithm than the algorithm to be implemented by the first encryption unit.

7. The cascading block cipher system of claim 6, wherein the first encryption algorithm implements the Advanced Encryption Standard (AES) encryption algorithm and the lightweight encryption unit implements at least one of the Rijndael algorithm and the Serpent algorithm.

8. A method comprising:
    encrypting, via a processor, at least one set of plaintext data including a plurality of plaintext data blocks stored in memory, wherein encrypting each set of plaintext data includes
        creating a shared secret state using a secret shared between a first party and a second party,
        applying a first encryption algorithm in a counter mode to encrypt a counter using the secret shared between first and second parties as a key to generate a secret inner key,
        applying a lightweight encryption algorithm using the secret inner key and the shared secret state to generate a plurality of blocks of ciphertext data from each of the plurality of plaintext data blocks, wherein the lightweight encryption algorithm is a different type of algorithm than the first encryption algorithm, and
        updating the shared secret state between each set of plaintext data.

9. The method of claim 8, wherein the first encryption algorithm comprises the Advanced Encryption Standard (AES) encryption algorithm and the lightweight encryption algorithm comprises at least one of the Rijndael algorithm and the Serpent algorithm.

10. The method of claim 8, wherein the first encryption algorithm comprises the Serpent algorithm and the lightweight encryption algorithm comprises the Rijndael algorithm.

11. The method of claim 8, wherein the first encryption algorithm comprises the Rijndael algorithm and the lightweight encryption algorithm comprises the Serpent algorithm.

12. The method of claim 8, wherein the shared secret comprises a session key.

13. The method of claim 8, wherein the first and second parties perform a key exchange procedure to exchange the shared secret between the parties.

14. An article comprising:
- a non-transitory storage medium having a plurality of machine readable instructions, wherein when the instructions are executed by a processor, the instructions provide for encryption of at least one set of plaintext data including a plurality of plaintext data blocks into ciphertext data, the instructions including, for each set of plaintext data
  - creating a shared secret state using a secret shared between a first party and a second party,
  - applying a first encryption algorithm in a counter mode to encrypt a counter using the secret shared between first and second parties as a key to generate a secret inner key,
  - applying a lightweight encryption algorithm using the secret inner key to generate a block of ciphertext data from each of the plurality of plaintext data blocks, wherein the lightweight encryption algorithm is a different type of algorithm than the first encryption algorithm,
  - updating the shared secret state for each set of plaintext data.

15. The article of claim 14, wherein the first encryption algorithm comprises the Advanced Encryption Standard (AES) encryption algorithm, and the lightweight encryption algorithm comprises at least one of the Rijndael algorithm and the Serpent algorithm.

16. The article of claim 14, wherein the first encryption algorithm comprises the Rijndael algorithm and the lightweight encryption algorithm comprises the Serpent algorithm.

* * * * *